United States Patent [19]

Lechavelier et al.

[11] 4,289,531
[45] Sep. 15, 1981

[54] PROCESS FOR RECOVERING PRECIOUS METALS

[75] Inventors: Hubert A. Lechavelier, Piscataway; Walter Drobot, Montclair, both of N.J.

[73] Assignee: Engelhard Minerals & Chemicals Corporation, Iselin, N.J.

[21] Appl. No.: 120,801

[22] Filed: Feb. 12, 1980

[51] Int. Cl.³ .................... C22B 11/04; C22B 15/00; C22B 19/00; C22B 23/00

[52] U.S. Cl. .................... 75/101 BE; 75/108; 75/117; 75/118 R; 75/118 P; 75/119; 75/120; 75/121; 210/688; 423/22; 423/24; 423/100; 423/122; 423/139

[58] Field of Search .............. 75/108, 101 BE, 121, 75/118 R, 118 P; 23/22, 24, 100, 112, 139; 210/38 B, 2

[56] References Cited

U.S. PATENT DOCUMENTS

| | | | |
|---|---|---|---|
| 3,255,172 | 6/1966 | Krajewski et al. | 75/101 BE |
| 3,719,473 | 3/1973 | Waiss et al. | 75/121 |
| 3,931,002 | 1/1976 | Otfenheym et al. | 210/38 B X |

Primary Examiner—G. Ozaki

[57] ABSTRACT

Platinum, palladium and other precious metals are recovered from aqueous media containing precious metal ions in solution by contacting the metal-containing solution with a proteinaceous material selected from the group consisting of feathers, hair, hoof meal and horn meal to collect the metals in concentrated insoluble form, and recovering metal from the proteinaceous material.

11 Claims, 1 Drawing Figure

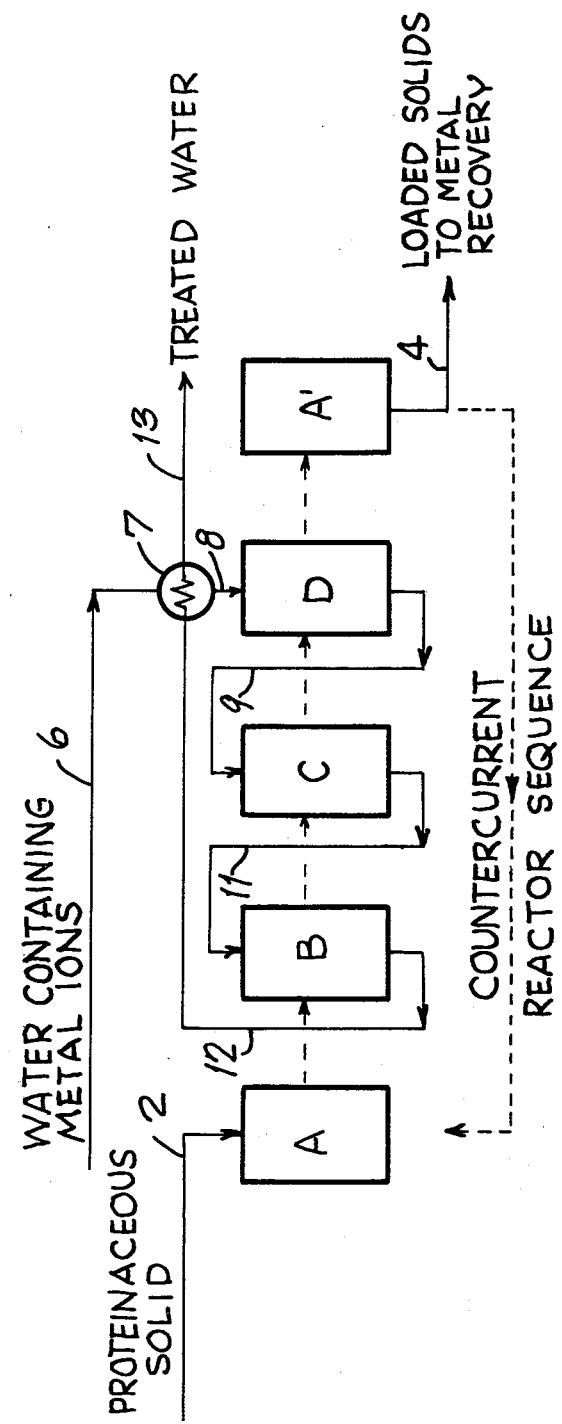

PROCESS FOR RECOVERING PRECIOUS METALS

This invention relates to a process of recovering metals from dilute aqueous solutions of metal salts by contacting a dilute aqueous solution containing dissolved metals with a fibrous proteinaceous material of animal origin. In one of its more specific aspects, this invention relates to a process for recovering precious metals and base metals from an aqueous liquid containing one or more of such metals in solution by contacting said aqueous liquid with a proteinaceous substance selected from the group consisting of feathers, hair, hoof meal and horn meal.

Industrial waste waters often contain various metals which for ecological or economical reasons it would be desirable to recover or remove from the water. It is known, for example, that large quantities of gold and other valuable metals are contained in sea water, but, up until the present time at least, there has been no economic method for recovering it. Many industrial waste waters contain dissolved salts of such economically important metals as platinum, rhodium, palladium, ruthenium, iridium, gold, and silver, as well as base metals, such as zinc, aluminum, iron, copper, tin, and nickel. Such dissolved metals are present as anions as well as in the form of anionic complexes and are contained in wastes, such as spent plating liquors and refinery waste solutions.

Precipitation by chemical methods and electrodeposition (or electrowinning) have been used for the removal or recovery of metal values from dilute aqueous solutions. Frequently, the concentrations of the metals are so low that the cost of recovering them from solutions by these methods exceeds their value. This invention now provides a process by which it is not only possible but economically feasible to recover noble metals and other valuable metals from dilute aqueous solutions by reaction with an animal protein, especially fibrous proteinaceous materials of relatively little economic value, i.e., hair, horns, hoofs, and feathers.

It has been proposed heretofore in U.S. Pat. No. 2,371,119 to recover metals from dilute aqueous solutions in which such metals are present by contacting the aqueous solution with wool. The interaction of wool with metal cations is reported by Masri et al, Textile Research Journal, April, 1974, page 298, which shows that wool is capable of taking up many metals, including platinum, palladium and silver, from solutions of the chlorides and nitrates of these metals. It has now been discovered, quite unexpectedly, that certain waste or low value by-products of the meat and poultry industries are as effective or more effective than wool for the recovery of precious metals from aqueous solutions.

In the process of the present invention, common animal wastes or by-products of the meat industry, e.g., hair, feathers, hoofs, and horns, are utilized for the recovery of precious metals from aqueous solutions. The process is carried out by contacting the aqueous solution with the proteinaceous material for a period of time sufficient to remove the dissolved metals from their solutions. The time of contact between the solution and the proteinaceous material may vary from about 10 minutes to 60 hours, preferably 1 to 12 hours. It has been found that some proteinaceous materials are more selective to certain of the precious metals than others. The optimum contact time required for substantial removal of any given metal from solution will depend to some extent upon the particular proteinaceous material and the particular metal undergoing recovery. Optimum contact times may be determined for any given combination of aqueous solution and proteinaceous substance. The effectiveness of the proteinaceous material for removal of a metal in accordance with this invention depends to some extent also upon the extent to which the material has been already loaded with recovered metals.

The pH of the solution undergoing treatment preferably is within the range of 2 to 3. While extraction of metals from aqueous solutions occurs over a wide pH range, test results indicate that pH values in the range of 5 to 11 are less favorable than pH values within the range of 1.2 to 5, while maximum recoveries of precious metals occur within the preferred pH range of 2 to 3. The process suitably is carried out at a temperature in the range of from just above freezing to as high as 90° C., preferably, in the range of 5° to 50° C.

The extraction of metal values from dilute solutions by the process of this invention is preferably carried out at atmospheric pressure and temperature although higher or lower pressures and temperatures may be used.

Contact between the metal-containing solution and the proteinaceous material may be continuous or batchwise. In a batch type operation, the dosage of proteinaceous material may be within the range of 1 to 20 weight percent based on the weight of the aqueous solution. A preferred method of operation involves continuous countercurrent contact between the aqueous solution and the proteinaceous material. In one preferred embodiment of a continuous countercurrent contacting method of operation, the proteinaceous material is contained in a series of stationary beds. An aqueous solution containing dissolved metals is passed through the series of stationary beds of proteinaceous material, contacting first a bed of material nearly saturated with respect to recovered metal values, then a bed containing a lesser amount of recovered metals, and so on until the last bed contacted is essentially barren of recovered metal, or substantially a fresh bed of proteinaceous material. As the first bed becomes loaded with metal, the flow of aqueous solution is switched to the next and a fresh bed of proteinaceous material is added to the series for the final contact with the aqueous solution. In a similar manner, aqueous solutions may be successively passed through a series of contacting zones which are stirred or agitated or maintained in a fluidized solids bed condition. All of these systems are well known in the arts of solvent extraction, water treatment, and the like.

Alternatively, successive batches of fresh, i.e., untreated, solution may be brought into contact with a batch of solid proteinaceous material, preferably in a reactor containing a stirrer or other appropriate means of agitation, and the batch processing continued until the proteinaceous material becomes loaded with metal. When the effectiveness of the proteinaceous material for metal recovery is substantially diminished due to loading with metal, it may be removed from the reactor and processed for recovery of metal values. Fresh or regenerated proteinaceous material is charged to the reactor to replace the loaded material removed therefrom. A series of two or more batch reactors may be employed in which treated aqueous liquid from one reactor is supplied as the aqueous liquid feed to another reactor. The second or any subsequent reactor may contain the same or a different proteinaceous material from that of the first or precedent reactor, the proteinaceous material in the second reactor having a lesser degree of metals saturation than that in the first reactor, and so on. Such a procedure applies the countercurrent principle of metals removal, as described above, to a metal solution successively exposed to a series of batch contact reactors, each containing a different batch of proteinaceous material. In a batch type operation, the relative proportions of proteinaceous material to solution may be within the range of 10 to 500 grams per liter of solution, preferably in the range of 50 to 200 grams per liter, where the proportion of added proteinaceous material governs the rate of metals removal and the time to achieve either substantial metal removal or saturation of the proteinaceous material.

In accordance with one aspect of the present invention, the metal values are recovered from the proteinaceous material containing the precious metals extracted from an aqueous solution by physical separation of the proteinaceous material from the solution, followed by extraction of the metal values from the proteinaceous material. Extraction of metal values may be accomplished by drying and complete oxidation of the organic matter in the proteinaceous material whereby the precious metal remains in the ash as a solid residue. Metal values may be recovered from either the metal-containing proteinaceous material or its ash by any of various known refining methods. For example, the metal values may be recovered by re-dissolving the metal in a concentrated mineral acid, such as hydrochloric acid or nitric acid, and the metal values recovered from the concentrated solution in known manner.

The accompanying drawing is a diagrammatic representation of a preferred embodiment of the process of this invention.

With reference to the drawing, a multi-stage process is illustrated utilizing three reactors or contactors in series. It is to be understood that the principles of this invention apply regardless of the number of reactors or contact zones in the plant design. A plurality of contactors are illustrated and are designated by the letters A, B, C, D, and A'. A and A' may be the same contactor in different stages of operation. As illustrated, Reactors B, C, and D are in service removing metal values from aqueous solutions containing dissolved metal salts, for example, waste water from a precious metals refinery. Reactor A is in the process of recharging fresh proteinaceous solid and Reactor A' is discharging loaded proteinaceous solid material for further treatment to recover the metals removed from the metals solution.

A suitable proteinaceous solid, such as fresh, wet chicken feathers, is charged into Reactor A through line 2. The reactors may be identical in construction and preferably are of the fixed bed type. As illustrated, the aqueous medium undergoing treatment passes downwardly through the beds of solid proteinaceous material, although either upflow or downflow, or even horizontal flow may be employed in the process.

Aqueous solution containing metals in ionic form, i.e., metals in solution, enters the system through line 6 where it may be passed through heat exchanger 7 to heat or cool the solution to the desired contacting temperature. The aqueous solution, e.g., refinery waste water, is introduced through line 8 to the upper portion of Reactor D of the figure and passed downwardly through the bed of proteinaceous material, for example, wet chicken feathers, contained in the reactor. The treated liquid, substantially free from entrained solids, is discharged from the lower portion of Reactor D and passed through line 9 to the upper portion of Reactor C. In Reactor C, the water containing residual metal values not removed by the proteinaceous material in Reactor D again contacts a bed of proteinaceous material in Reactor C, effecting further removal of metal values from the aqueous liquid feed stream. The treated liquid from Reactor C, in turn, is discharged from the lower portion of Reactor C through line 11 and introduced into the upper portion of Reactor B containing a relatively fresh bed of solid proteinaceous material. Treated water, depleted in metal ions, is discharged from the lower portion of Reactor B through line 12 and may be passed through heat exchanger 7 and then through line 13 for disposal or recirculation to the process from which the solution was derived.

As the bed of proteinaceous solid in Reactor D becomes loaded with metals, the rate at which it is able to remove metals from solution gradually diminishes. When the bed of solid in Reactor D has been loaded with metals to the desired extent or its rate effectiveness for metal removal diminished to a predetermined value, the Reactor D is removed from the train and the flow of solution containing dissolved metal shifted to Reactor C. At this point, the freshly charged Reactor A is brought into this series as Reactor B and Reactor D then becomes Reactor A'. The original Reactor A', now empty, becomes Reactor A and is reloaded with fresh proteinaceous solid as indicated by Reactor A in the figure. As the proteinaceous bed in Reactor A' becomes loaded with metals and its effectiveness decreases, the said bed is removed from said Reactor and it is conveyed via line 4 to a recovery unit (not shown) for metal recovery.

While various piping arrangements may be utilized to effect the change in reactor sequence, the net effect is as though Reactor A becomes Reactor B, Reactor B becomes Reactor C, Reactor C becomes Reactor D, and Reactor A' becomes Reactor A. The reactor sequence is indicated by the dotted lines in the figure.

The following examples illustrate the comparative effectiveness of various proteinaceous materials for recovery of various metals from solution.

EXAMPLES 1-3

One gram samples each of hoof meal, tapestry white wool, and raw chicken feathers were placed in centrifuge tubes with 25 ml of 100 ppm solutions of chloroplatinic acid and placed on a reciprocal shaking machine at 28° C. Each cycle was originally for one day. At the end of each cycle, the solution in each tube was replaced with fresh solution. After several cycles, the cycle times were increased to two or more days as indicated in Table I. Assay of residual platinum after centrifugation of the solids was done colorimetrically using the stannous chloride test. At the end of 38 cycles, 90 percent of the platinum in the solution had been recovered by the hoof meal with a total recovery of 85.7 mg platinum per gram of hoof meal. At the end of 35 cycles 81 percent of the platinum had been recovered by the wool samples for a total of 70.5 mg of platinum per gram of wool. Ninety two percent of the platinum was recovered by the feathers in 35 cycles for a total recovery of 80.6 mg of platinum per gram of feathers. Results are summarized in Table II.

TABLE I

Cumulative Test Data,
Exposure Days, Total Mg Pt. Recovered

| Total No. Extraction Cycles | Example 1, Wool Days | Mg Pt. | Example 2, Chicken Feathers Days | Mg Pt. | Example 3, Hoof Meal Days | Mg Pt. |
|---|---|---|---|---|---|---|
| 5 | 5 | 12.4 | 5 | 12.5 | 5 | 12.4 |
| 10 | 14 | 24.2 | 14 | 24.5 | 10 | 24.7 |
| 15 | 21 | 35.0 | 21 | 36.1 | 18 | 36.6 |
| 20 | 28 | 45.3 | 28 | 47.4 | 24 | 48.0 |
| 25 | 36 | 54.3 | 36 | 58.5 | 30 | 58.7 |
| 30 | 46 | 62.3 | 46 | 69.7 | 40 | 69.0 |
| 35 | 60 | 70.5 | 60 | 80.6 | 53 | 80.0 |
| 38 | — | — | — | — | 59 | 85.7 |

TABLE II

| Contact Material | Total Platinum Recovered, % | Final Pt. Loading, Mg Pt. per g. Initial Weight |
|---|---|---|
| Wool | 81 | 70.5 |
| Feathers | 92 | 80.6 |
| Hoof Meal | 90 | 85.7 |

EXAMPLE 4

The effectiveness of feathers for the recovery of precious metals from dilute solutions is indicated in a series of tests with the results summarized in Table III. In these tests, one liter samples of an intermediate refinery solution relatively rich in platinum and rhodium was contacted with successive 50 gram portions of proteinaceous material at 28° C. with continuous agitation for 20 hours each exposure. Residual metals concentrations in milligrams per liter (mg/l) and percentages of each metal recovered (%) are shown in the table.

TABLE III

| Precious Metal | Control Sol'n. mg/l | Cleaned Duck Feathers Single Exposure mg/l | % | Two Exposures mg/l | % | Raw Chicken Feathers Single Exposure mg/l | % | Two Exposures mg/l | % |
|---|---|---|---|---|---|---|---|---|---|
| Pt | 1950 | >100 | — | 145 | 92.5 | 77 | 96 | 1.2 | >99 |
| Pd | 168 | 63 | 62.5 | 15 | 91.1 | 6.2 | 96.3 | 0.7 | >99 |
| Rh | 42 | 32 | 23.8 | 32 | 23.8 | 30 | 28.6 | 19 | 54.8 |

Similarly, a 50 gram portion of cleaned goose feathers, in a single exposure, recovered 67 percent of the palladium, 31 percent of the rhodium, and an undetermined amount of platinum from a one liter sample of the same intermediate refinery solution.

EXAMPLE 5

Hog hair (Wilson & Company) was tested and proved effective for recovery of platinum and palladium from the test solution of Example 4 when contacted with the test solution at 28° C. with continuous agitation for 20 hours at a dosage of 100 grams hog hair per liter of test solution. Test results are summarized in Table IV.

TABLE IV

| Precious Metal | Control, Sol'n. (mg per l) | Hog Hair mg/l | % Rec. |
|---|---|---|---|
| Pt | 200–400 | 21 | 90–95 |
| Pd | 130 | 1.2 | >99 |
| Rh | 25 | 25 | 0 |

It is evident from the foregoing examples that proteinaceous animal waste products selected from the group consisting of feathers, hair, hoof meal and horn meal, are effective materials for the removal of precious metals from dilute solutions.

We claim:

1. A process for removing metal from an aqueous medium containing in solution one or more metals selected from the group consisting of platinum, rhodium, palladium, ruthenium, gold, silver, iridium, zinc, aluminum, iron, copper, nickel and tin which comprises contacting said aqueous medium with at least one unmodified proteinaceous material selected from the group consisting of feathers, hair, hoof meal and horn meal for a period of time sufficient to convert metal in solution to water insoluble form in association with said proteinaceous material, and separating loaded proteinaceous material containing removed metal from the resulting treated aqueous medium.

2. The process of claim 1 wherein metal values are recovered from said loaded proteinaceous material.

3. The process of claim 1 wherein the aqueous medium contains at least one of the metals platinum, palladium and rhodium, in solution.

4. A process according to claim 1 wherein said proteinaceous material is maintained in contact with said aqueous medium for a period of at least one hour.

5. A process according to claim 3 wherein said contacting step is carried out at a temperature in the range of 5° to 90° C.

6. A process according to claim 1 wherein said proteinaceous material is contacted with successive amounts of fresh aqueous medium.

7. A process according to claim 6 wherein successive amounts of fresh proteinaceous material are contacted with previously contacted aqueous medium.

8. A process according to claim 7 wherein proteinaceous material which has been subjected to contact with successive amounts of fresh aqueous medium is withdrawn from said process and treated for the recovery of metal values therefrom.

9. A process according to claim 8 wherein a series of batches of proteinaceous material are contacted with said aqueous medium in succession, the solution contacting first the batch of proteinaceous material which has previously been contacted with the greatest amount of aqueous medium and finally contacting the batch of proteinaceous material which has previously been contacted with the least amount of aqueous medium.

10. A process according to claim 1 wherein said aqueous medium is introduced into an elongated contacting zone at a point adjacent one end and said proteinaceous material is introduced at a point adjacent the other end of said zone wherein said aqueous medium and said proteinaceous material move in said zone in opposite directions and in intimate countercurrent contact with one another, treated aqueous medium is removed from said zone adjacent the point of introduction of said proteinaceous material and loaded proteinaceous material is removed from said zone adjacent the point of introduction of said aqueous medium.

11. A process according to claim 9 or claim 10 wherein said aqueous medium contains at least one of the metals platinum, palladium and rhodium, in solution.

* * * * *